United States Patent [19]
Myroniuk

[11] Patent Number: 5,784,824
[45] Date of Patent: Jul. 28, 1998

[54] FISH RETAINER FOR ICE FISHING

[76] Inventor: Mike Myroniuk, Box 204, Myrnam, Alberta, Canada, T0B 3K0

[21] Appl. No.: 641,492

[22] Filed: May 1, 1996

[51] Int. Cl.⁶ .................................................... A01K 69/00
[52] U.S. Cl. ..................................................... 43/4
[58] Field of Search .................... 43/4; 210/470; 294/53.5

[56] References Cited

U.S. PATENT DOCUMENTS

| | | | |
|---|---|---|---|
| 1,420,919 | 6/1922 | Fike | 294/53.5 |
| 3,063,110 | 11/1962 | West | 294/53.5 |
| 3,264,028 | 8/1966 | Rasmussen | 294/19 |
| 3,289,850 | 12/1966 | Gubash | 210/470 |
| 3,722,940 | 3/1973 | Misjak | 294/1 R |
| 3,857,787 | 12/1974 | Kinne | 210/470 |
| 4,866,872 | 9/1989 | Guilbault et al. | 43/4 |
| 5,140,767 | 8/1992 | Traut | 43/4 |

*Primary Examiner*—Kurt Rowan
*Attorney, Agent, or Firm*—Anthony R. Lambert

[57] ABSTRACT

A fish retainer for ice fishing includes a base and an elongate member depending from the base. The elongate member has a first end, a second end and a longitudinal axis. A fish retaining gate is asymmetrically mounted to the second end. The elongate member is mounted for rotation about the longitudinal axis. The rotation of the elongate member to a first rotational position positions the fish retaining gate in a non-obstructing position. The rotation of the elongate member to a second rotational position positions the fish retaining gate in an obstructing position. A spring urges the elongate member toward the second rotational position. A locking mechanism locks the elongate member in the first rotational position. Upon the locking mechanism being released, the elongate member is urged by the spring to the second rotational position in which the fish retaining gate is in the obstructing position.

6 Claims, 4 Drawing Sheets

FISH RETAINER FOR ICE FISHING

FIELD OF THE INVENTION

The present invention relates to a fish retainer for use when ice fishing.

BACKGROUND OF THE INVENTION

One of the most difficult aspects of fishing through a hole in an ice covered lake, is endeavouring to pull a fish that has been caught through the hole. For this reason, a variety of fish retaining apparatus have been developed for use by fisherman when ice fishing. One example of a fish retainer is U.S. Pat. No. 3,722,940 which issued in 1973 to Misjak for an invention entitled "Ice Fish Saver". Another example of a fish retainer is U.S. Pat. No. 4,866,872 which issued in 1989 to Guilbault for an invention entitled "Apparatus and Method for Retrieving Fish Caught While Ice Fishing". Both of the prior art references identified above include a fish retaining gate positioned at the end of a rod that extends into the hole through the ice. The rod is rotated by means of a handle to move the fish retaining gate between an obstructing and non-obstructing position. In the non-obstructing position, the fish retaining gate is positioned out of register with the hole through the ice. In the obstructing position, the fish retaining gate blocks the lower end of the hole, thereby preventing the fish from escaping.

The fish retainers described above have one common drawback, the fisherman must let go of his fishing tackle with one hand in order to position the fish retainer. Unfortunately, it is while his hand is occupied in positioning the fish retainer that the fisherman is most vulnerable to the loss of the fish.

SUMMARY OF THE INVENTION

What is required is a fish retainer that reduces the risk of loss of the fish while it is being positioned.

According to the present invention there is provided a fish retainer for ice fishing, which includes a base and an elongate member depending from the base. The elongate member has a first end, a second end and a longitudinal axis. A fish retaining gate is asymmetrically mounted to the second end. The elongate member is mounted for rotation about the longitudinal axis. The rotation of the elongate member to a first rotational position positions the fish retaining gate in a non-obstructing position. The rotation of the elongate member to a second rotational position positions the fish retaining gate in an obstructing position. Biasing means urge the elongate member toward the second rotational position. Locking means lock the elongate member in the first rotational position. Upon the locking means being released the elongate member is urged by the biasing means to the second rotational position in which the fish retaining gate is in the obstructing position.

With the fish retainer, as described above, a fisherman merely releases the locking mechanism and the fish retaining gate is moved by the biasing means to an obstructing position. It is preferred that a pedal activated triggering mechanism be used to release the locking mechanism. The biasing means moves the fish retaining gate faster than is possible manually. Having the triggering mechanism pedal activated, frees the fisherman's hands for the task of landing the fish.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
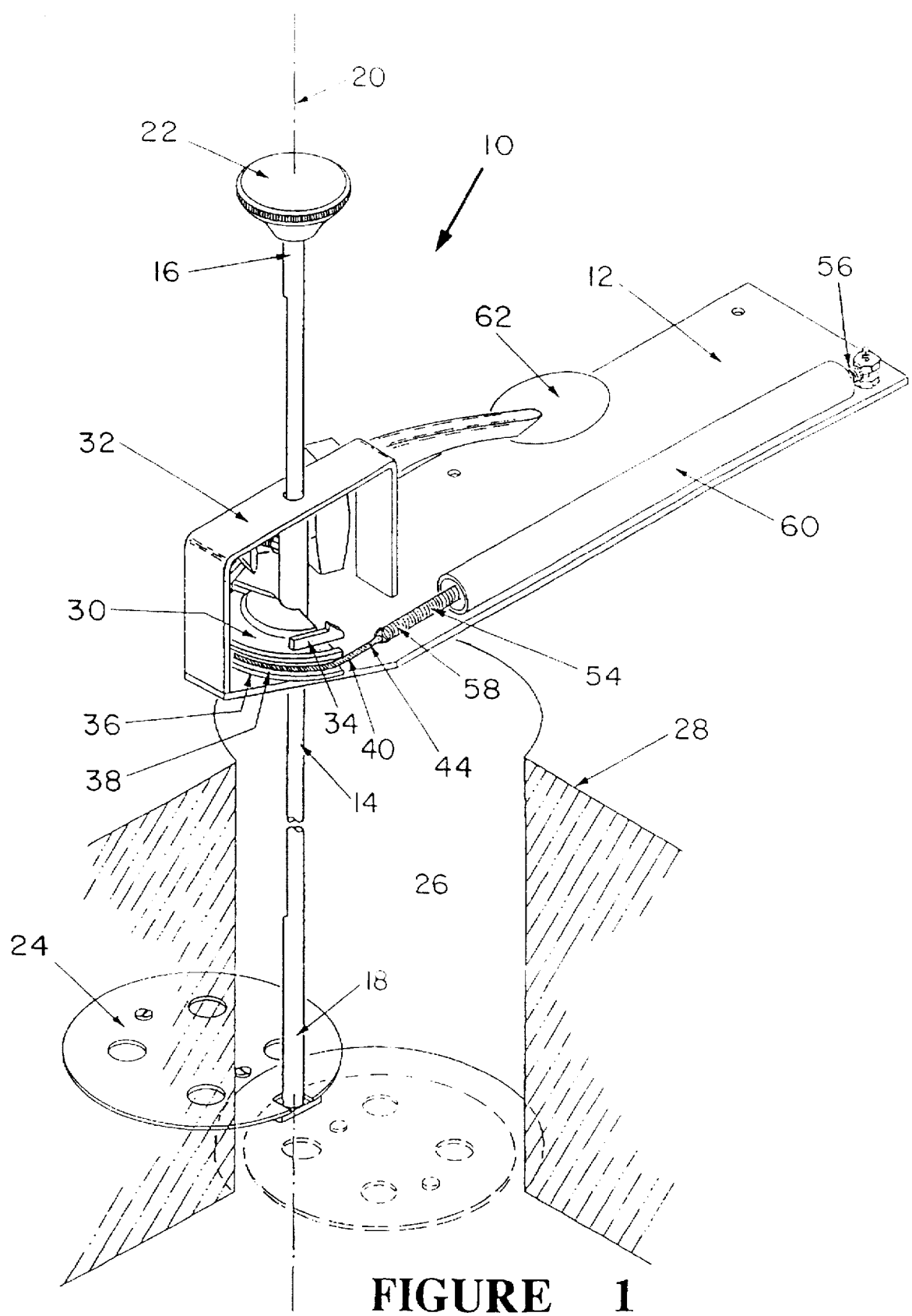
FIG. 1 is a perspective view of a fish retainer for ice fishing constructed in accordance with the teachings of the present invention.

The preferred embodiment, a fish retainer for ice fishing generally identified by reference numeral 10, will now be described with reference to FIGS. 1 through 5.

Figure 2:
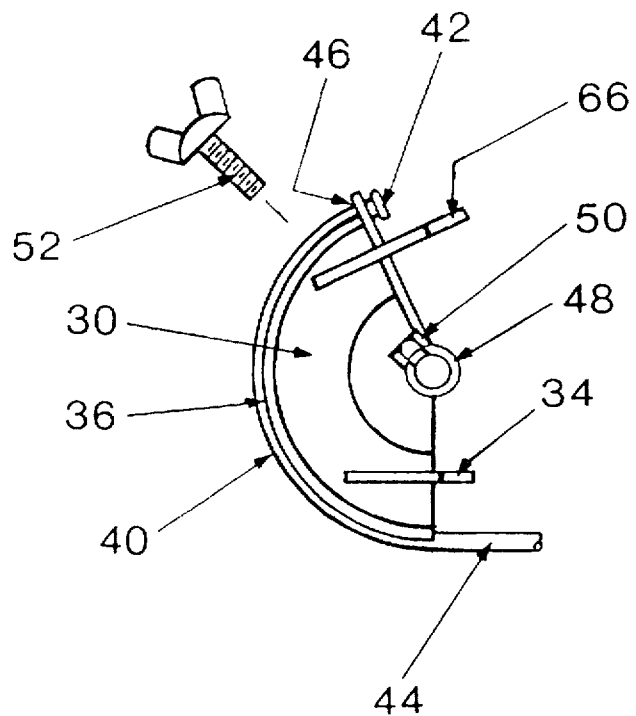
FIG. 2 is a top plan view of a locking mechanism from the fish retainer illustrated in FIG. 1.
Figure 3:
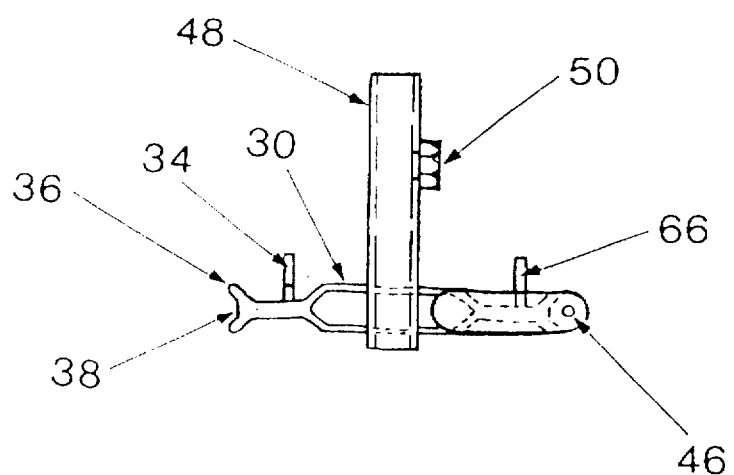
FIG. 3 is a side elevation view of the locking mechanism illustrated in FIG. 2.
Figure 4:
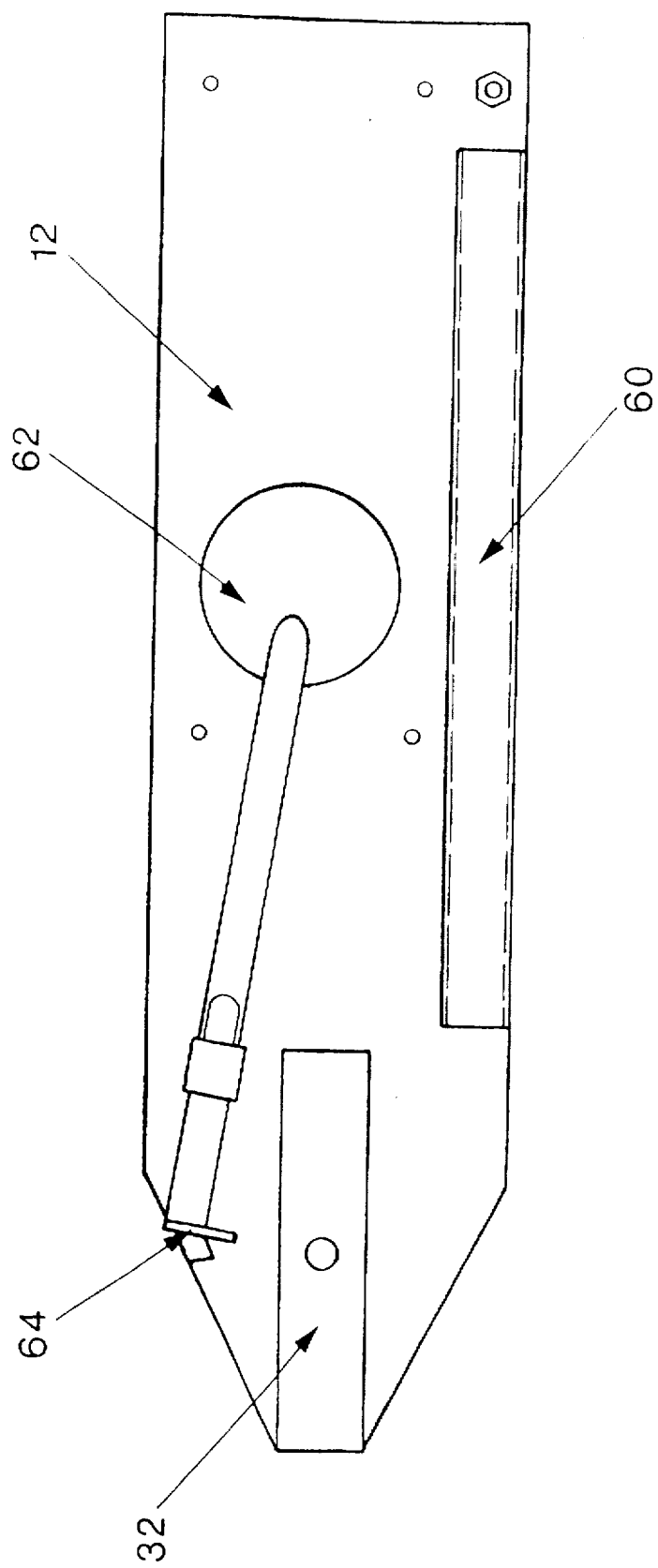
FIG. 4 is a top plan view of a base with pivotally attached trigger mechanism from the fish retainer illustrated in FIG. 1.
Figure 5:
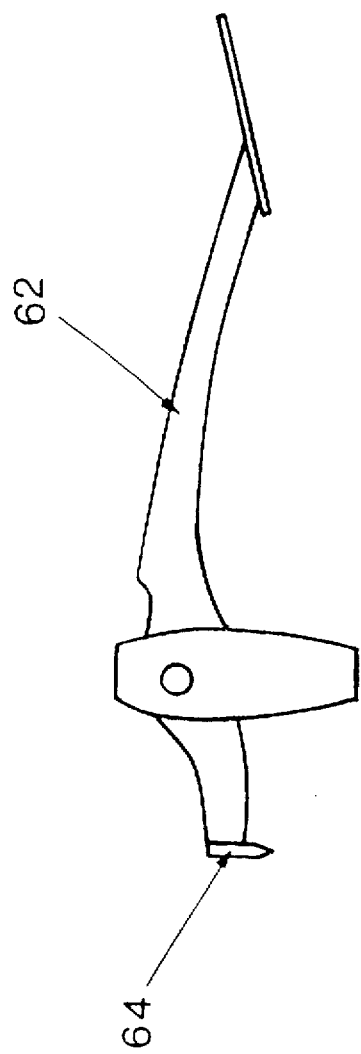
FIG. 5 is a side elevation view of the trigger mechanism illustrated in FIG. 4.

Referring to FIG. 1, fish retainer 10 includes a planar base 12. An elongate rod 14 depends from base 12. Elongate rod 14 has a first end 16, a second end 18 and a longitudinal axis 20. A handle 22 is positioned at first end 16. Handle 22 is used for manually resetting fish retainer 10, as will hereinafter be further described. A fish retaining gate 24 is asymmetrically mounted to second end 18. Elongate rod 14 is mounted for rotation about longitudinal axis 20. FIG. 1 illustrates fish retainer 10 positioned relative to a hole 26 through ice 28. Rotation of elongate rod 14 to a first rotational position, places fish retaining gate 24 in a non-obstructing position relative to hole 26. Rotation of elongate rod 14 to a second rotational position, places fish retaining gate 24 in an obstructing position obstructing hole 26 so a fish cannot escape. A catch support 30 is mounted to elongate rod 14 immediately adjacent to base 12. Referring to FIG. 1, an overlying frame 32 ensures that catch support 30 maintains its position relative to base 12. Catch support 30 supports a first hook-like catch 34. Catch support 30 has an arcuate outer surface 36 with a peripheral groove 38. A line 40 is provided having a first end 42 and a second end 44. Referring to FIGS. 2 and 3, first end 42 of line 40 is secured to catch support 30, by threading line 40 through a hole 46 in catch support 30 and tying first end 42 to form a knot. Referring to FIG. 1, line 40 is wrapped around arcuate outer surface 30 of catch support 30 with line 40 positioned in peripheral groove 38. Referring to FIGS. 2 and 3, catch support 30 has a sleeve 48 in which elongate rod 14 is received. Sleeve 48 has a transversely intersecting threaded aperture 50 which receives a clamping bolt 52. Catch support 30 is clamped onto elongate rod 14 by means of clamping bolt 52. Referring to FIG. 1, a spring 54 is provided which has a first end 56 and a second end 58. First end 56 is secured to base 12. Second end 58 is attached to second end 44 of line 40 which extends from catch support 30. A spring guard 60 overlies spring 54. Spring guard 60 is a safety measure intended to prevent a fisherman being pinched by spring 54 during use. Spring 54 urges elongate rod 14 toward the second rotational position. A pedal operated trigger 62 is pivotally mounted to base 12. Referring to FIGS. 4 and 5, a second hook-like catch 64 is positioned on trigger 62. First hook-like catch 34 engages second hook-like catch 64 when elongate rod 14 is in the first rotational position. Referring to FIG. 2, catch support 30 also has a third hook-like catch 66. Third hook-like catch engages second hook-like catch 64 when elongate rod 14 is in the second rotational position.

The use and operation of fish retainer 10 will now be described with reference to FIGS. 1 through 5. Referring to FIG. 1, fish retaining gate 24 is inserted into hole 26 through ice 28. Clamping bolt 52 is loosened to enable elongate rod 14 to slide through sleeve 48 of catch support 30. Elongate rod 14 is adjusted relative to base 12 until fish retaining gate 24 is positioned at the lowermost peripheral edge of hole 26. The objective is to leave sufficient room to rotate elongate rod 14 to move fish retaining gate 24 to a non-obstructing position, but not so much room that a fish could escape from hole 26 with fish retaining gate 24 positioned in the obstructing position. Once the desired adjustment of elongate rod 14 is effected, clamping bolt 52 is tightened. Elongate rod 14 is then manually placed in the first rotational position with fish retaining gate 24 in the non-obstructing position. This is accomplished by grasping and rotating elongate rod 14 by means of handle 22, until first catch 34 on catch support 30 engages second catch 64 on trigger 62. When a fisherman is landing a fish and is in need of fish retainer 10, he steps onto pedal operated trigger 62. Trigger 62 pivots disengaging second catch 64 from first catch 34 thereby permitting elongate rod 14 to be urged by spring 54 to the second rotational position in which fish retaining gate 24 is in an obstructing position. By loosening clamping bolt 52, elongate rod 14 can be freed to move relative to base 12. By pulling upwardly upon handle 22, elongate rod 14 can be made to move toward base 12. When this occurs fish retaining gate 24, lifts the fish in hole 26 up toward base 12. This makes it easier for the fisherman to grasp the fish and remove it from hole 26.

It will be apparent to one skilled in the art that modifications may be made to the illustrated embodiment without departing from the spirit and scope of the invention as hereinafter defined in the Claims.

The embodiments of the invention in which and exclusive property or privilege is claimed are defined as follows:

1. A fish retainer for ice fishing, comprising:

a base;

an elongate member depending substantially vertically from the base, the elongate member having a first end, a second end and a longitudinal axis, a fish retaining gate being asymmetrically mounted in a fixed substantially perpendicular orientation to the second end, the elongate member being mounted for rotation about the longitudinal axis, rotation of the elongate member resulting in orbital movement of the fish retaining gate on a substantially horizontal plane, the rotation of the elongate member to a first rotational position positioning the fish retaining gate in a non-obstructing position and the rotation of the elongate member to a second rotational position positioning the fish retaining gate in an obstructing position;

biasing means urging the elongate member toward the second rotational position; and locking means locking the elongate member in the first rotational position, such that upon the locking means being released the elongate member is urged by the biasing means to the second rotational position in which the fish retaining gate is in the obstructing position, the locking means including a catch support mounted to the elongate member, the catch support supporting a first catch that in the first rotational position mates with a second catch positioned on a pivotally mounted trigger member on the base, such that upon the trigger member being pivoted the second catch is disengaged from the first catch thereby permitting the elongate member to be urged by the biasing means to the second rotational position.

2. The fish retainer as defined in claim 1, wherein the biasing means includes a spring having a first end and a second end, the first end being secured to the base, the second end being attached to the catch support.

3. The fish retainer as defined in claim 2, wherein the catch support has an arcuate outer surface with a peripheral groove, a line being provided having a first end and a second end, the first end of the line being secured to the catch support, the second end of the line being secured to the second end of the spring, the line being disposed in the peripheral groove of the arcuate surface of the catch support.

4. The fish retainer as defined in claim 1, wherein the catch support supports a third catch that in the second rotational position mates with the second catch positioned on the pivotally mounted trigger member.

5. The fish retainer as defined in claim 1, the catch support being clamped to the elongate member, upon the clamping force of the clamp being released the elongate member being axially movable relative to the base.

6. A fish retainer for ice fishing, comprising:

a base;

an elongate rod depending from the base, the elongate rod having a first end, a second end and a longitudinal axis, a fish retaining gate asymmetrically mounted to the second end, the elongate rod being mounted for rotation about the longitudinal axis, the rotation of the elongate rod to a first rotational position positioning the fish retaining gate in a non-obstructing position and the rotation of the elongate rod to a second rotational position positioning the fish retaining gate in an obstructing position;

a catch support mounted to the elongate rod immediately adjacent to the base, the catch support supporting a first catch, the catch support having an arcuate outer surface with a peripheral groove, a line being provided having a first end and a second end, the first end of the line being secured to the catch support, the line being disposed in the peripheral groove of the arcuate surface of the catch support;

a spring having a first end and a second end, the first end being secured to the base, the second end being attached to the second end of the line extending from the catch support, the spring urging the elongate rod toward the second rotational position; and a pedal operated trigger pivotally mounted to the base, a second catch positioned on the trigger, the first catch engaging the second catch when the elongate rod is in the first rotational position, such that upon pressure being exerted upon the pedal operated trigger, the trigger pivots disengaging the second catch from the first catch thereby permitting the elongate rod to be urged by the biasing means to the second rotational position in which the fish retaining gate is in an obstructing position.

* * * * *